(12) United States Patent
Dettmann

(10) Patent No.: US 6,523,334 B1
(45) Date of Patent: Feb. 25, 2003

(54) BATTERY-POWERED WALK-BEHIND GREENSMOWER

(75) Inventor: Benjamin D. Dettmann, Los Gatos, CA (US)

(73) Assignee: Textron Inc., Providence, RI (US)

( * ) Notice: Subject to any disclaimer, the term of this patent is extended or adjusted under 35 U.S.C. 154(b) by 7 days.

(21) Appl. No.: 09/696,700

(22) Filed: Oct. 26, 2000

(51) Int. Cl.[7] .............................................. A01D 69/02
(52) U.S. Cl. ........................... 56/11.9; 56/16.7; 56/249
(58) Field of Search ................................ 56/11.9, 16.7, 56/249, 294, 10.8, 10.5; 180/68.5

(56) References Cited

U.S. PATENT DOCUMENTS

| | | | |
|---|---|---|---|
| 3,581,480 A | | 6/1971 | O'Connor |
| 3,841,069 A | * | 10/1974 | Weck |
| 3,946,543 A | * | 3/1976 | Templeton et al. .......... 56/10.9 |
| 4,117,651 A | * | 10/1978 | Martin, Jr. |
| 4,322,934 A | * | 4/1982 | Doi .............................. 474/25 |
| 4,354,149 A | * | 10/1982 | Armond et al. |
| 4,835,409 A | * | 5/1989 | Bhagwat et al. |
| 4,854,540 A | * | 8/1989 | Balek |
| 4,995,227 A | | 2/1991 | Foster |
| 5,394,678 A | | 3/1995 | Lonn |
| 5,402,626 A | | 4/1995 | Zinck |
| 5,442,901 A | * | 8/1995 | Niemela et al. |
| 5,490,370 A | | 2/1996 | McNair |
| 5,606,851 A | | 3/1997 | Bruener |
| 5,727,372 A | * | 3/1998 | Kanitz et al. |
| 5,909,064 A | * | 6/1999 | Feil et al. |
| 5,937,622 A | * | 8/1999 | Carrier et al. |
| 6,047,786 A | * | 4/2000 | Stevenson et al. |
| 6,125,621 A | * | 10/2000 | Burch |
| 6,170,241 B1 | * | 1/2001 | Shibilski et al. |

* cited by examiner

Primary Examiner—Thomas B. Will
Assistant Examiner—Meredith C. Petravick
(74) Attorney, Agent, or Firm—Harness, Dickey & Pierce, P.L.C.

(57) ABSTRACT

A greensmower having a cutting reel and a traction member and an independent electric circuit and motor for driving each. A handle is attached to the reel for mower guidance by an operator in a walk-behind position. Separate electric controls are connected to each motor for separate speeds for each motor and thereby control the clip rate of the mowing. There are low battery power read-outs and automatic shut-offs. Provision is made for traction powering of the mower even when the reel motor is not operating because of low battery power. A lift-out battery pack is shiftably mounted on the mower for producing the desired force of the mower on the ground.

4 Claims, 5 Drawing Sheets

BATTERY-POWERED WALK-BEHIND GREENSMOWER

This invention relates to a battery-powered walk-behind greensmower, and more particularly, it relates to a greensmower arranged to control the grass clip-rate and to provide a battery pack and support therefor.

BACKGROUND OF THE INVENTION

The prior mower art is aware of greensmowers useful in mowing golf course greens which require exacting mowing results to assure that the grass is even in its cut throughout the extent across the green. Some of those mowers are walk-behind mowers and some are riding mowers. Of course the riders are inherently heavier than the walk-behind and they therefore tend to create undesirable impressions in the green, and they have other disadvantages.

Greensmowers generally employ a reel-type mower, and some of them are concerned about the clip-rate of the mowing, and that determines the quality of the mowed grass. The term clip-rate means the distance between the locations of the individual sequential grass cuts produced by the rotating cutting blades successively moving over the grass. The grass between the locations of the cuts will necessarily be left taller than the cut grass at the cut locations. So the cut rate is vital to producing an optimum condition of the grass on the golf course green.

It is also important that the greensmower be quiet in operation and light in weight and that it permit the operator to see the results of the mowing while the grass is being mowed. Further, the ultimate greensmower will be a walk-behind mower which is battery powered and has electrical circuitry which preludes mower overloads and consequent mower damage; gives the operator current information on the quantity of the battery charge; automatically and manually shuts off under both desirable and undesirable conditions; automatically shuts off the electric power by a predetermined time after the mower has been used for mowing; has both operator-presence handle-located control and electric switch control for the mower power; the motors for the mower and the traction drive automatically stop upon sensing a predetermined heat level within them; and there is the ability to adjust the pressure exerted on the ground by the reel mower roller.

It is an object of this invention to provide a mower and a method which achieve the aforementioned desirable results. Some of the features that produce those results include the fact that the mower is battery-powered for convenience and quiet operation on the golf course; there is a walk-behind mower for light weight and maneuverability on the greens; there is a greens roller for desired rolling of the green in conjunction with the mowing; there is a counterbalancing of the mower in its end-to-end dimension; there is an adjustable support for the battery so that its weight can be desirably applied relative to the ground rollers of the reel mower itself; and there is a battery box containing a plurality of batteries for providing optimum electric power and for lifting the box with the batteries for servicing, such as replacing and charging.

Particularly, this invention provides the apparatus and method for establishing the selectable clip-rate desirable for the green being mowed. In achieving this objective, the operator does not need to adjust nor control more than only one variable, namely only the mower ground speed. However, in another embodiment, both the traction speed and the reel speed are controllable by the operator at the handle location and during cutting operation.

This invention also provides for the arrangement of the support of the battery, actually in a pack of several batteries disposed in a box, and having the box selectively movable relative to the remainder of the mower and thereby control the pressure the mower rollers exert on the ground. In this arrangement, skilled greensmower operators can arrange for their own selectable ground pressure, and they can make their selections at the mowing sites.

This invention also provides the apparatus and method to both manually and automatically control the electric power in driving both the traction member and the cutting reel. Therefore, there is an avoidance of overload on the mower. Also, there is an electric signal which indicates the level of electric power available for powering the mower, so the operator can then respond accordingly, such as by changing or charging the battery even before the battery is dead.

Also, there is an electrical control system that will shut down the power to the reel motor when the battery voltage drops below a predetermined level of voltage. Even before that, there is an electric signal that indicates to the operator that the battery power is low. However, the system will still allow the use of the traction drive, so the operator can then transport the mower to a desired parking destination, but the operator will not be able to cut grass to a time when the battery is completely discharged and thereby damaged. This feature prevents abusive deep discharge of the battery, thereby avoiding harm to the battery.

The electrical system employed herein includes provision for a manual main switch control for the entire system, and it includes a manual switch for the reel motor which can be driven at a constant speed. There is an electrical variable resistor, such as a potentiometer, connected with the traction motor, and the resistor is controllable by the operator at the mower handle location, so the operator has the selectivity of the desired ground speed for the mower and for his walking speed. With the reel switch, the power to the reel can be shut off and the system can be operated under traction drive only, and thereby the system can be used only as a lawn roller.

In the event of overload on either the traction motor or the reel motor, those motors will automatically shut down. This feature is achieved by a sensor that senses a predetermined level of heat in the motors. Also, in the event that the operator leaves the mower with the two motors turned off but with the main switch key still on, the system will automatically turn itself off after a predetermined time delay and thereby avoid any danger, battery drain, or abuse of the mower.

DETAILED DESCRIPTION OF THE PREFERRED EMBODIMENT AND METHOD

Figure 2:
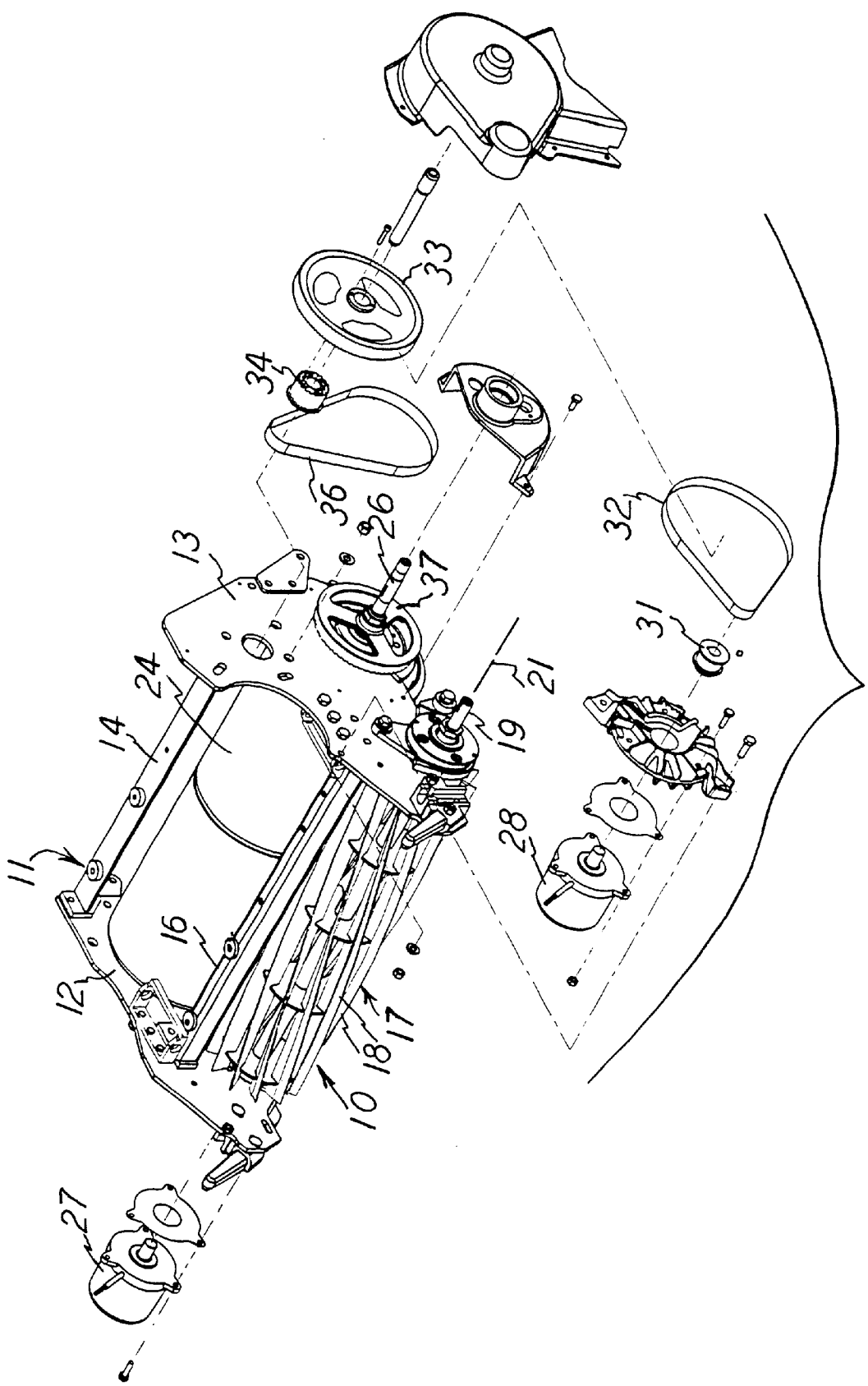
FIG. 2 is a front perspective exploded view of the reel mower of FIG. 1.

The drawings show a conventional reel-type mower 10 which includes a frame structure 11 having two side plates 12 and 13 and cross-frame pieces 14 and 16 as best seen in FIG. 2. There is a conventional rotatable greensmower reel 17 with its usual spiraled blades 18 equally spaced around the reel shaft 19 which is elongated and defines a rotation axis 21 extending along the length of the shaft 19. There is the usual reel fixed bed knife at 22, and the blades 18 orbit relative to the shaft 19 and move past the knife 22 for the usual and well-known function of the grass cutting. Also, there is a reel mower rotatable roller 23 at the front of the assembly and, along with an unshown rear roller, it supports the reel mower for movement on the ground.

Figure 1:
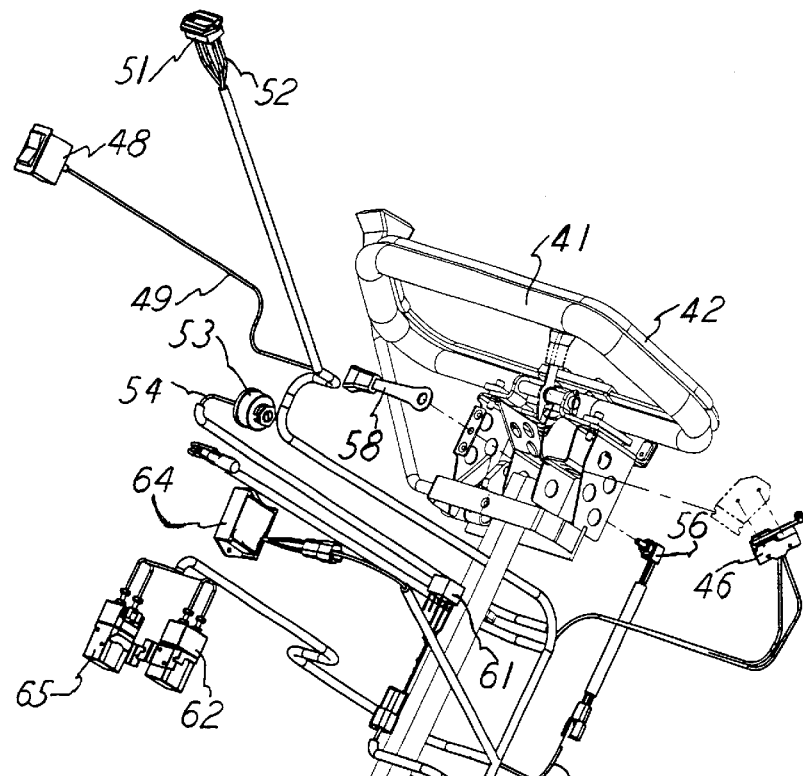
FIG. 1 is a front perspective view of a lawnmower of this invention.
Figure 1:
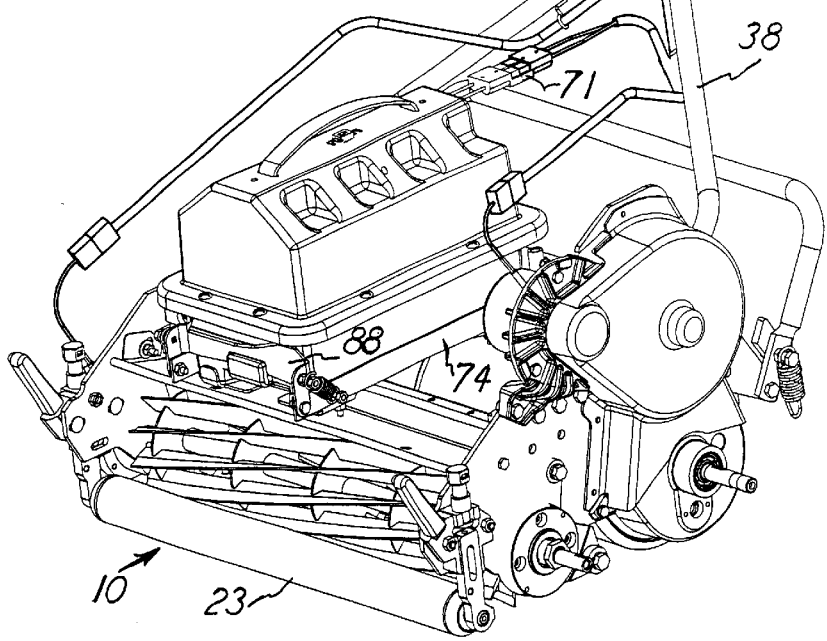
Figure 4:
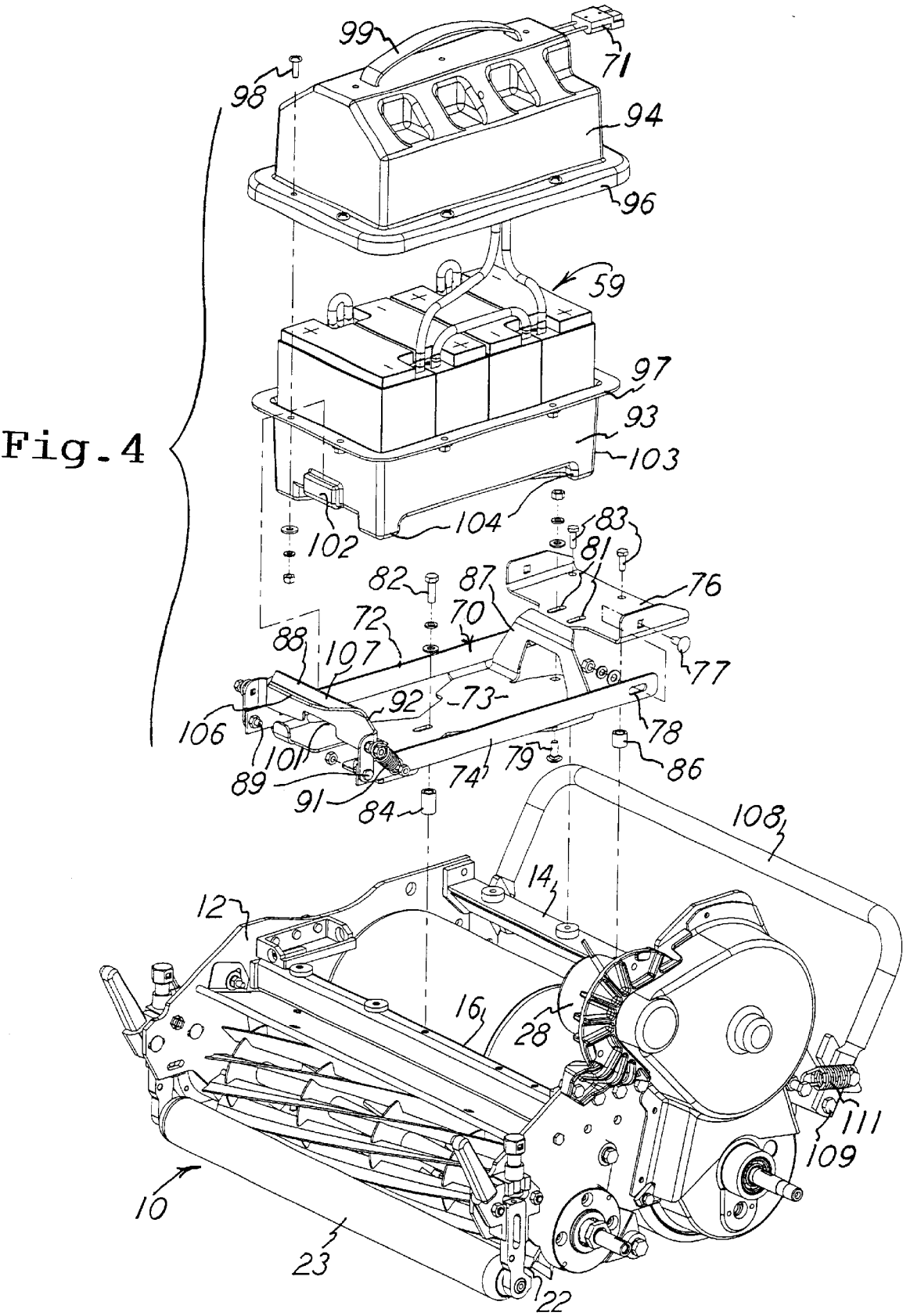
FIG. 4 is a front perspective exploded view of the battery and reel of FIG. 1.

FIGS. 1, 2, and 4 show the above, and they also show a lawn roller 24 included in the assembly and rotatably mounted on the structure 11 through a roller axle 26. The roller 24 supports the lawnmower assembly on the ground and serves as the traction drive for the lawnmower. Other ground-supporting traction members could be substituted.

The rotational drive to the reel 17 and the traction roller 23 is through an electrical system which includes two separate electric motors 27 and 28, respectively. These two motors are a respective part of two branches of electric circuitry herein. The motors 27 and 28 are respectively suitably bolted to the structure side plates 12 and 13 and they are drivingly connected with the reel 17 and the traction roller member 24. The reel motor 27 suitably drivingly engages the reel shaft 19 for rotating the reel in the forward mowing direction which is leftward in these drawings. The motors 27 and 28 are through Motor Appliance Corp., St. Louis, Mo., model M12160-2.

The traction motor 28 has a drive pulley 31 thereon, and the pulley 31 connects with a drive belt 32 which drives an idler pulley 33. Pulley 33 meshes with a drive pulley 34 which in turn drives a belt 36 and a pulley 37 which is drivingly on the roller axle 26. Thus there is a traction drive train from the motor 28 to the ground-engaging traction member 24, and thusly the lawnmower is moved in the forward operating direction. That operation may be the grass cutting action of the reel 17 along with the roller action of the roller 24, or it may be the operation of only the roller 24, as mentioned.

Figure 3:
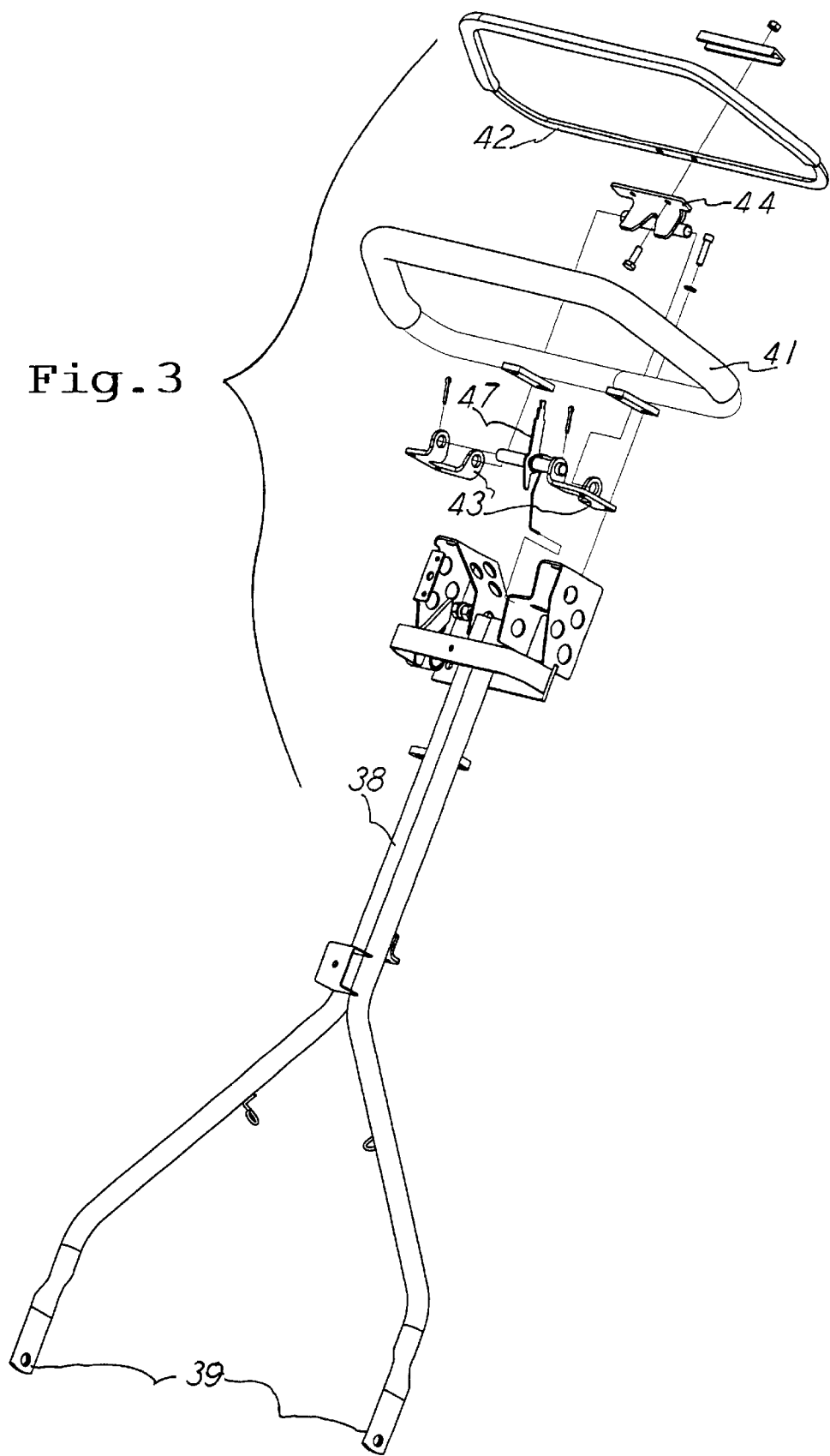
FIG. 3 is a front perspective exploded view of the handle of FIG. 1.

FIGS. 1 and 3 show a handle which is suitably connected with the structure 11 at the handle lower end 39. The handle upper end has a hand grip portion 41 which the operator can hold in steering the lawnmower. There is a movably mounted bail or operator hand control 42 pivotally connected to the handle 38, and it is movable toward and away from the grip portion 41. Two pivot mounting plates 43 are connected with the grip 41, and the plates 43 present a pivot mounting for a bracket 44 which is attached to the bail 42.

In that arrangement, the operator can hold both the grip 41 and the bail 42 while guiding the lawnmower. As will be more clearly seen later, upon release of the bail, the traction drive is interrupted, and the bail is an electric switch manual control. FIG. 1 shows that a bail switch 46 is mounted on the handle 38 in a position to be subject to electrical actuation by forward movement of the bail 42, and the relationship with the switch 46 may be in any suitable manner. Also, there is a bail lockout lever 47 which is spring-loaded to its active position which precludes the bail 42 from being moved into its active position, and thus the switch 46 is in its "OFF" position. The user can release the lever 47 and then pivot the bail forward for activation of the switch 46 and place the switch in its "ON" position for mower operation.

Additionally, the vicinity of the handle upper end 42 also includes electrically elements mounted thereon, which are therefore presented to the user for his observation or actuation. An electric and manually controlled switch 48, through a wire 49, is mounted on the handle and is connected with the reel motor 27 to control power to the operation of the motor 27. A battery fuel gage 51 is mounted on the handle and is visible by the user and it is connected through wires 52 into the hereinafter described electric circuitry. The gage is one through Curtis Instruments, Inc., Mt. Kisco, N.Y., as part 906T48HWDAN. A manually controllable key switch 53 is mounted on the handle and is available to the user at the handle location and it is connected in the circuitry through wires 54. A manually controllable variable resistor, such as a potentiometer 56, is connected in that branch of the circuitry through wires 57, and it is mounted on the handle and it controls the power to the traction motor 28 and it has a control handle 58 connected thereto and disposed within easy reach of the user. The potentiometer is through Spectrol Electronics Corp. Ontario, Calif., part 657-2-0-103.

Thus there are the aforementioned five electric elements of the switch 46, the switch 48, the gage 51, the switch 53, and the potentiometer control 58, all of which are available to the user at the convenience of the location of the upper handle 42. That emphasizes the significance of the walk-behind lawnmower of this invention.

Figure 5:
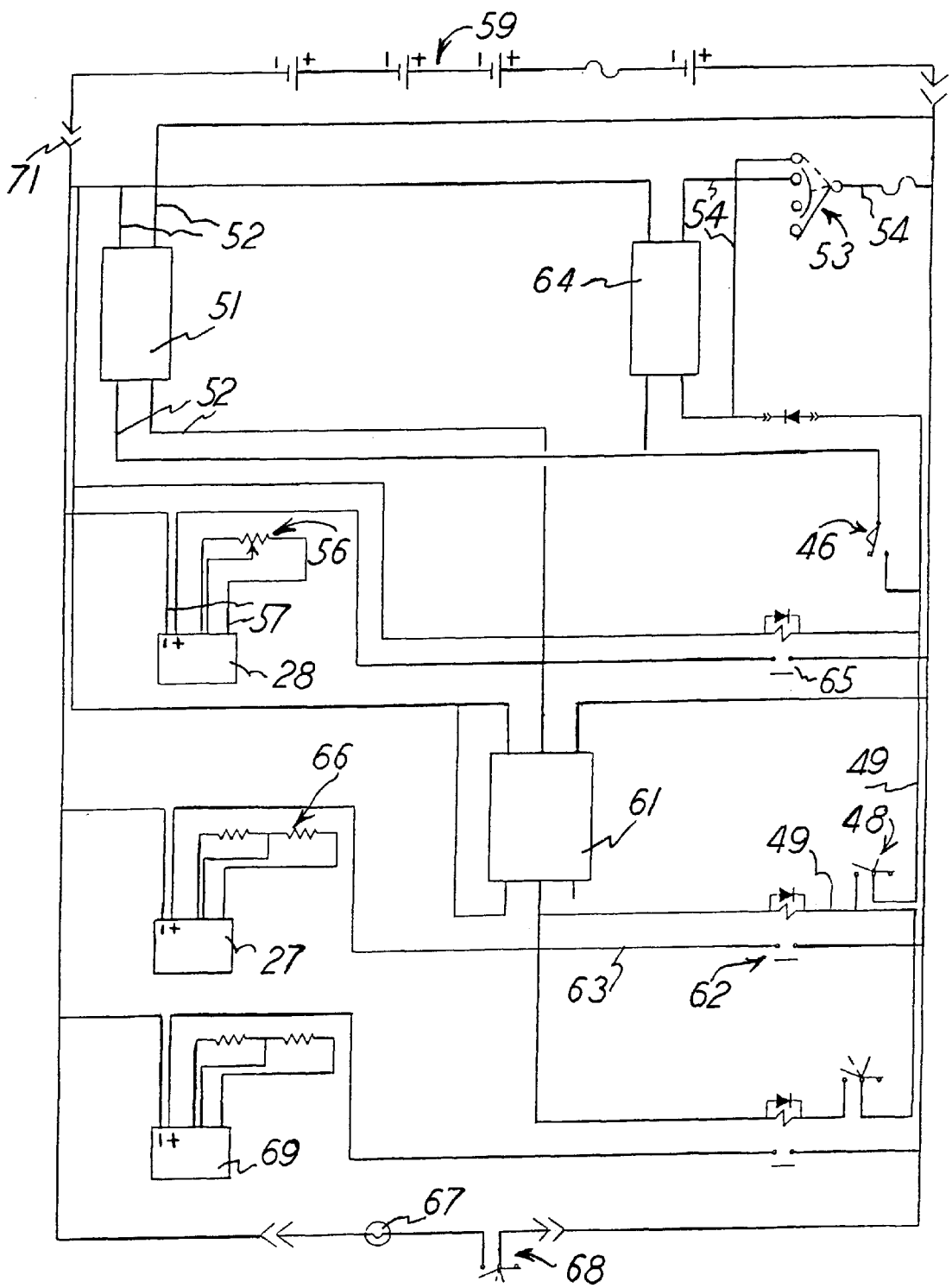
FIG. 5 is an electrical schematic view of the electric system employed in this invention.

FIG. 5 shows the electric circuitry which includes the battery pack 59 shown to have four batteries in the total pack, as also seen in FIG. 4. In addition to the electric elements previously mentioned the circuitry includes an electric sensor in the fuel gage element 51 to sense the level of the electric power in the battery 59 and to register that on an operator readout, of any conventional design, at the gage 51 on the handle, so the operator always knows the power in the battery 59. The relay is one through said Curtis Instruments, Inc., as part 1178E36480010. The gage 51 is connected to a battery cutout relay 61, and, upon the occasion of a predetermined low voltage, such as a depth of discharge (DOD) of seventy percent of full charge, a flashing light can signal the operator. At eighty percent of DOD the fuel gage 51 provides a double flashing light and a signal to the battery cutout relay 61 to activate the relay 61 and thereby terminate current to the reel motor 27 through an electric contactor 62 which is connected with the motor 27 through a wire 63. That forces the operator to discontinue cutting the grass and to ultimately tend to the battery which is protected from deep discharge and consequent harm. However, the system still allows the operator to drive the lawnmower by use of the traction motor 28 and to a service location. The contactors are through said Curtis Instruments, Inc. part SW60P48DCSupp/120.

After the battery is rectified, the operator must reactivate the system by setting the key switch 53 into the start mode to energize the system and then reactivate the bail 42 and the bail switch 46. Closing the switch 53 activates a time delay module 64. Module 64 provides an electrical shutdown system where after fifteen minutes of non-operation, the time delay module will remove power to the entire system. This feature is to render the lawnmower inoperative when it is parked for fifteen minutes, and the re-start sequence will then be employed. The module is through Marlin Technologies, Inc. 1105 Commerce Ct. Horicon, Wis., part M371.

Another feature of the system is that in the event either motor 27 or 28 is jammed or stalled, such as when the electric current exceeds an amperage for a predetermined length of time, say fifty amps for one-half second, there is a sensor built into each motor that produces an automatic shutdown of that motor. That can be a conventional type sensor, but it is uniquely employed in this system.

Also of conventional arrangement in the motors is protection against overload, and there is a heat sensor in the motors. Internally built into the motors 27 and 28 is a shutdown sensor that senses heat generation in components in the motors and will shutdown the motor when these components exceed the predetermined heat limit. Again, after the overload is relieved, the start-up sequence is employed to reactivate the lawnmower.

In the re-start, the key switch 53 is activated to the start position and that energizes the time delay module 64 and the battery fuel gage 51. Closing the reel control switch 48 and the bail switch 46, current is directed to the motor contactor 62 and to the reel motor 27. Current is also directed to a contactor 65 connected with the bail switch 46 for directing current to the traction motor 28.

In the FIG. 5 showing, the traction motor 28 is subject to the variable control 56 to permit the operator to select the ground speed of the lawnmower. Selectable walking speeds, rather than having a riding mower speed, is important. In the embodiment of FIG. 5, the reel motor 27 is shown to be controlled by a fixed control 66. However, in the reel control branch, the control 66 could be replaced by a potentiometer, such as the potentiometer 56, and then the reel rotation speed would be variable and under the direct control of the operator when a handle-located potentiometer control, like the control 58 is provided for the reel motor 27. In instances where it is not preferred to have the operator alter reel rotation speed on the mowing site, the embodiment of FIG. 5 is to be employed.

As viewed in FIG. 5, the lower portion thereof shows a signal light 67 and a manual switch 68 and provision for another motor 69, such as a groomer motor, if desired. Also, the top location in FIG. 5 shows an electrical connector or plug 71 which is manually connectable for connecting the system with the battery pack 59.

FIGS. 1 and 4 show the presence and the mounting of the battery 59. The structure cross bars 14 and 16 are fixedly connected with the mower side plates 12 and 13, and they support a battery tray 70 which includes a planar base 73 and two side rails 72 and 74, all as one integral unit. There is a floor extension 76 adjustably bolted to the side rails 72 and 74 through bolts, such as bolt 77, and elongated slots, such as slot 78, in the side rails 72 and 74. The extension 76 is also adjustably attached to the tray base 73 by bolts, such as bolt 79 through elongated slots 81. Screws 82 and 83 extend through the tray assembled base and connect with the mower structure at cross pieces 14 and 16, with spacers 84 and 86 therebetween.

In that manner, the battery tray is adjustable fore-and-aft of the mowing direction, and its weight can thus be selectively shifted relative to the reel mower to adjust the weight effective on the mower rollers, such as the one shown front roller 23.

The tray 70, as just described, also has a rear abutment or upright wall 87 affixed as a portion of the tray. A front latch 88 is pivotally attached at pivot pins 89, and it is a portion of the tray. Tension springs, such as shown spring 91, urge an upright wall 92 of the latch 88 rearwardly and toward the abutment 87.

The battery 59 is shown to be in four separate batteries, all connected in series connection and supported in a battery box base 93 which is rectilinear and upwardly open to receive the four batteries in the shown side-by-side positioning. A battery box top 94 mates with the base 93 to form a complete enclosure of a rectilinear box for the four batteries. The top 94 and bottom 93 are bolted together at respective flanges 96 and 97 with bolts, such as bolt 98. A handle 99 is attached to the box.

The latch 88 has an opening 101 therein, and the box 93 has a protrusion 102 and the opening 101 snugly receives the protrusion 102 when the box is sitting on the tray base 73. Thus, the box back wall 103 abuts the abutment 87 and the box is held down by the engaged latch 88. The box is restricted at its sides by the overlapping two said rails 72 and 74. The box has feet 104 which support the battery and box assembly on the tray.

To remove the assembly of the box and the battery from the mower, the user need only grip a ledge 106 on the latch and pivot the latch forwardly to release at the protrusion 102. Then, disconnecting the wires at the connector 71, the assembly can be lifted off the mower through the handle 99. Replacement of the battery on the mower is achieved by simply lowering the assembly onto the tray, and the latch 88 has a convex curved portion 107 which slidably engages the battery box to pivot the latch forwardly until the battery box is on the tray base 73 and the latch 88 will then automatically connect with the protrusion. Connecting the connector 71 will complete the replacement operation.

A ground or floor support stand 108 is pivotally connected to the mower 10 on pivot bolts, such as shown bolt 109, and it extends from end to end on the mower and upwardly in the inoperative position, as seen in FIGS. 1 and 4. Pivoting the stand 108 clockwise, as viewed in FIGS. 1 and 4, will place it underneath the mower 10 and thus will upwardly support the mower off the ground at the back of the mower 10. That is useful for connecting unshown transport wheels, inspection, and servicing of mower. Tension springs, such as spring 111, urge the stand upwardly to its shown inoperative position.

This greensmower may have eight reel blades 18. Per the reel revolution, the number of blades 18 affect the clip rate. Also, in the FIG. 5 embodiment, the electric control 66 for the reel motor 27 can be arranged in the shop to produce a selected rpm in the motor 27. Then the user mowing the green will control the clip rate only through the operator presence hand control 58 for adjusting the rpm of the motor 28 and thereby establish the clip rate by the adjustment of only a single control.

What is claimed is:

1. A battery-powered walk-behind greensmower for movement on the ground in a mowing direction of movement comprising:

a mobile structure having a rotatable ground-engaging traction member for imparting traction movement to said mower for movement on the ground in the mowing direction of movement, a handle connected with said structure for guiding said mower in the mowing direction, a bed knife supported by said structure and having a cutting edge extending along a line transverse to the mowing direction, a grass cutting reel rotatably supported on said structure on a rotation axis and having cutting blades equally spaced around said axis for orbiting of said blades about said axis and being disposed in grass cutting relationship with said bed knife and having said blades equally spaced apart from each other and disposed to sequentially move past said bed knife cutting edge to establish a clip-rate for cutting grass in proportion to the speed of rotation of said reel, a first electric motor supported on said structure and being in rotational driving relationship with said reel for rotating said reel, a second electric motor supported on said structure and being in rotational driving relationship with said traction member and being located adjacent a first axial end of said reel, a battery tray supported on said structure and being located adjacent a second axial end of said reel and being positioned to counter-balance the weight of said second electric motor on said structure, a battery supported on said tray, and an electric circuit electrically connected between said battery and both said motors for rotation of said reel and said traction member.

2. The battery-powered walk-behind greensmower as claimed in claim 1, including:

ground engaging rollers supporting said reel and with one of said reel rollers disposed forward of said bed knife relative to the mowing direction, and said battery tray and said structure have adjustment connections therebetween arranged for movement of said tray and said battery in a fore-aft direction and relative to said one reel roller for establishing the pressure that said one reel roller exerts on the ground.

3. A battery-powered walk-behind greensmower for movement on the ground in a mowing direction of movement comprising:

a mobile structure having a rotatable ground-engaging traction member for imparting traction movement to said mower for movement on the ground in the mowing direction of movement, a handle connected with said structure for guiding said mower in the mowing direction, a bed knife supported by said structure and having a cutting edge extending along a line transverse to the mowing direction, a grass cutting reel rotatably supported on said structure on a rotation axis and having cutting blades equally spaced around said axis for orbital movement of said blades about said axis and being disposed in grass cutting relationship with said bed knife and having said blades equally spaced apart from each other and disposed to sequentially move past said bed knife cutting edge to establish a clip-rate for cutting grass in proportion to the speed of rotation of said reel, a battery on said structure, two independent electric drive trains connected with said battery and each of said drive trains including an electric circuit and an electric motor, a first one of said drive trains being connected with said reel for rotating said reel at only a constant speed, a second one of said drive trains being connected with said traction member and including an adjustable electric variable resistor for driving said traction member at varying selective speeds in the mowing direction and thereby control the grass clip-rate in direct proportion to the selected traction speed, said motor in said second drive train being located adjacent a first axial end of said reel, a battery tray supported on said structure and being located adjacent a second axial end of said reel and being positioned to counter-balance the weight on said structure of said electric motor in said second drive train, and said battery supported on said tray.

4. The battery-powered walk-behind greensmower as claimed in claim 3, including:

ground engaging rollers supporting said reel and with one of said reel rollers disposed forward of said bed knife relative to the mowing direction, and said battery tray and said structure have adjustment connections therebetween arranged for movement of said tray and said battery fore-and-aft in the direction of the mowing and relative to said one reel roller for establishing the pressure that said one reel roller exerts on the ground.

* * * * *